United States Patent [19]

Merving

[11] Patent Number: 5,425,201
[45] Date of Patent: Jun. 20, 1995

[54] CAPSULE HAVING INCLINED END FACE FOR TREATING WOODEN ELEMENT

[76] Inventor: Hans A. K. Merving, August Stalbergsvag 10A, 644 00 Torshälla, Sweden

[21] Appl. No.: 80,008

[22] Filed: Jun. 23, 1993

Related U.S. Application Data

[63] Continuation-in-part of Ser. No. 29,428, Mar. 9, 1993, which is a continuation-in-part of Ser. No. 555,734, Jul. 23, 1990, Pat. No. 5,207,021, which is a continuation-in-part of Ser. No. 410,884, Sep. 22, 1989, Pat. No. 5,010,684, which is a continuation-in-part of Ser. No. 393,841, Aug. 7, 1989, Pat. No. 4,905,410, which is a continuation of Ser. No. 184,072, Apr. 20, 1988, abandoned.

[51] Int. Cl.$^6$ ............................................. A01G 29/00
[52] U.S. Cl. ...................................................... 47/57.5
[58] Field of Search ......................................... 47/57.5

[56] References Cited

U.S. PATENT DOCUMENTS

| | | |
|---|---|---|
| 1,999,458 | 4/1935 | Hollister . |
| 2,970,404 | 2/1961 | Beaufils et al. . |
| 3,691,683 | 9/1972 | Sterzik . |
| 3,706,161 | 12/1972 | Jenson . |
| 4,308,689 | 1/1982 | Jenson et al. . |
| 4,342,176 | 8/1982 | Wolfe . |
| 4,344,250 | 8/1982 | Fahlstrom . |
| 4,905,410 | 3/1990 | Merving . |

Primary Examiner—Ramon S. Britts
Assistant Examiner—Joanne C. Downs
Attorney, Agent, or Firm—Keck, Mahin & Cate

[57] ABSTRACT

A capsule for insertion into a bore includes a hollow head section having a first diameter, a hollow shank, extending along a central axis of the capsule and having a second diameter smaller than the first diameter, interconnected with the head section by a hollow tapered transitional section, and a cap received within the head section. The cap defines, together with inner surfaces of the shank, the transitional section and the end face, a capsule volume for storing a chemical agent. The capsule is insertable into the bore so that when the capsule is inserted into the bore, the distal edge portion of the shank end face abuts an end wall of the bore. The shank is frangible so that when a force is applied to the head section, causing the head section to at least partly move into the bore, the distal edge portion translates the force into a stress which breaks the shank to release the chemical agent from the capsule volume. To assist it in breaking, the shank is provided with a groove extending around its circumferential exterior and dividing it into a first shank section, extending between the transitional section and the groove, and a second shank section, extending between the shank end face and the groove.

19 Claims, 3 Drawing Sheets

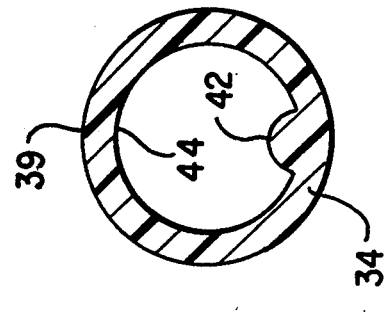
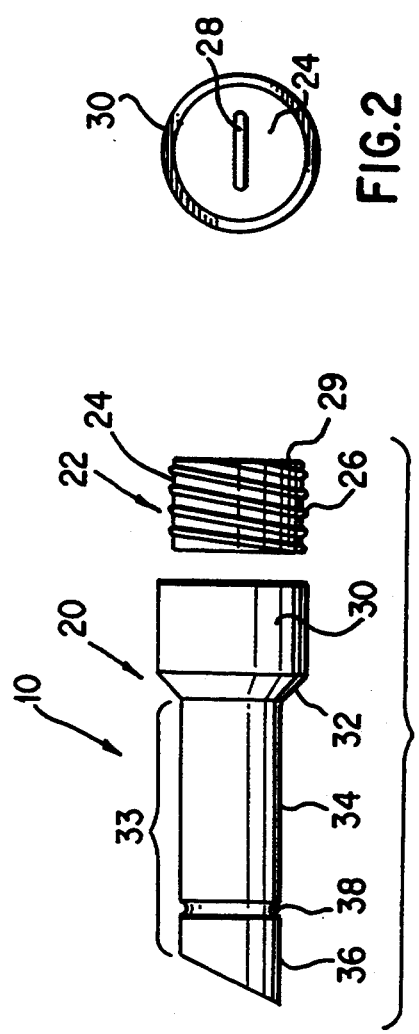
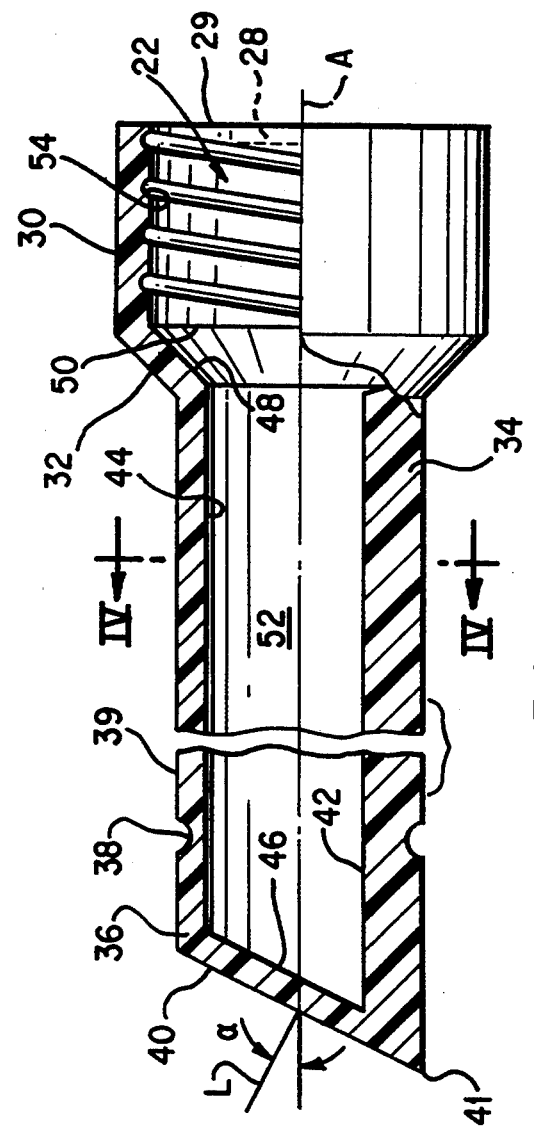

CAPSULE HAVING INCLINED END FACE FOR TREATING WOODEN ELEMENT

This is a continuation-in-part of U.S. patent application Ser. No. 08/029,428, filed Mar. 9, 1993, which is a continuation-in-part of U.S. patent application Ser. No. 07/555,734, filed Jul. 23, 1990, now U.S. Pat. No. 5,207,021, which is a continuation-in-part of U.S. patent application Ser. No. 07/410,884, filed Sep. 22, 1989, now U.S. Pat. No. 5,010,684, which is a continuation-in-part of U.S. patent application Ser. No. 07/393,841, filed Aug. 7, 1989, now U.S. Pat. No. 4,905,410, which is a continuation of U.S. patent application Ser. No. 07/184,072, filed Apr. 20, 1988, now abandoned.

BACKGROUND OF THE INVENTION

1. Field of the Invention

This invention relates to a capsule for feeding a chemical agent into the phloem layer of a tree or into other wooden elements, such as a telephone pole, a window frame or sill, studs or other elements used in housing construction or the like, etc. The chemical agent may be a herbicide, if the treatment is designed to kill a tree, a fungicide or other medicant or nutrient, if the treatment is designed to cure a tree from a disease or deficiency, or a wood preservative or insecticide, etc., if the treatment is used in some other type of wooden element.

2. Description of Related Art

The prior art relating to implantation treatments typically involves either injection of a cartridge into a tree without preparing a pre-drilled hole in the tree or implantation of a capsule in a pre-drilled hole in a tree. Examples of prior art devices for such treatment are set forth below.

U.S. Pat. No. 3,691,683 discloses a cartridge containing a chemical liquid agent where the cartridge is hammered into a tree so that it fractures upon impact. However, the cartridge is inserted only half-way in the tree. Therefore, upon fracture, much of the liquid agent is wasted on the surface of the tree, where it also presents a hazard to the person making the injection.

U.S. Pat. No. 4,308,689 discloses a tree treatment capsule for insertion into a pre-drilled hole in a tree. The capsule is made of a frangible material and contains a liquid agent so that an impact force applied to an end cap of the capsule causes breaking of the capsule. This known capsule is disadvantageous since it begins to break near the bore opening. The capsule thus presents the risk that the liquid agent will be exposed to areas outside of the bore opening. The end cap of the known capsule also requires a very complicated structural design which renders the capsule expensive to manufacture.

SUMMARY OF THE INVENTION

This invention concerns a particularly constructed capsule adapted for insertion into a bore. The capsule includes a hollow head section having a first diameter and a hollow shank, extending along a central axis of the capsule, having a second diameter smaller than the first diameter and interconnected with the head section by a hollow tapered transitional section. The shank includes an end face closing off an end thereof opposite to the transitional section and inclined relative to the central axis of the capsule so as to define a distal edge portion and a proximal edge portion of the end face.

A cap is received within the head section and defines, together with inner surfaces of the shank, the transitional section and the end face, a capsule volume for storing a chemical agent. The capsule is insertable into the bore so that when the capsule is inserted into the bore, the distal edge portion abuts an end wall of the bore. The shank is frangible so that when a force is applied to the head section, causing the head section to at least partly move into the bore, the distal edge portion translates the force into a stress which breaks the shank to release the chemical agent from the capsule volume.

The shank is provided with a groove extending around its circumferential exterior and dividing the shank into a first shank section, extending between the transitional section and the groove, and a second shank section, extending between the end face and the groove.

BRIEF DESCRIPTION OF THE DRAWINGS

FIG. 1 is an exploded side view of a chemical agent containing capsule according to this invention.

FIG. 2 is an end view of the capsule illustrated in FIG. 1 showing the cap received within the hollow body of the capsule.

FIG. 3 is a side view, partly in section, of the capsule according to this invention.

FIG. 4 is a sectional view along line IV—IV of FIG. 3.

DESCRIPTION OF THE PREFERRED EMBODIMENTS

Figure 5:
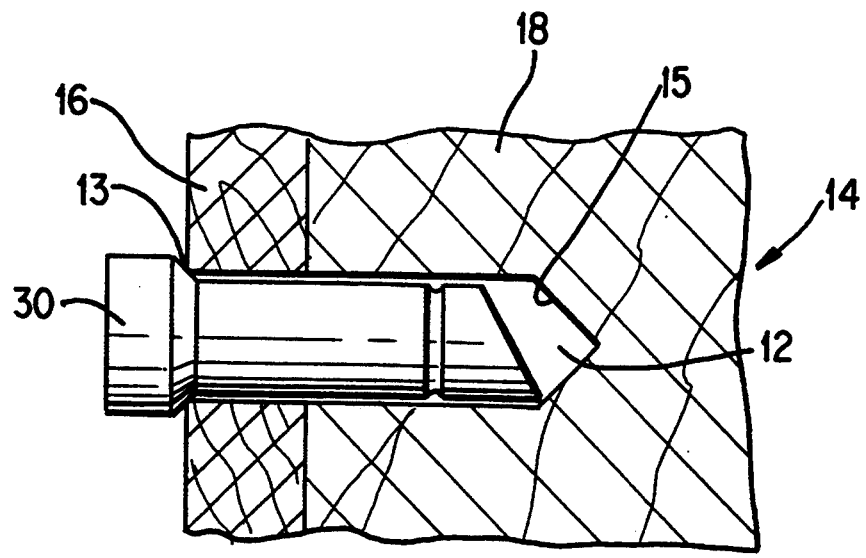
FIG. 5 is a view of the capsule of this invention after it has been inserted in a bore but before an impact force has been applied.
Figure 6:
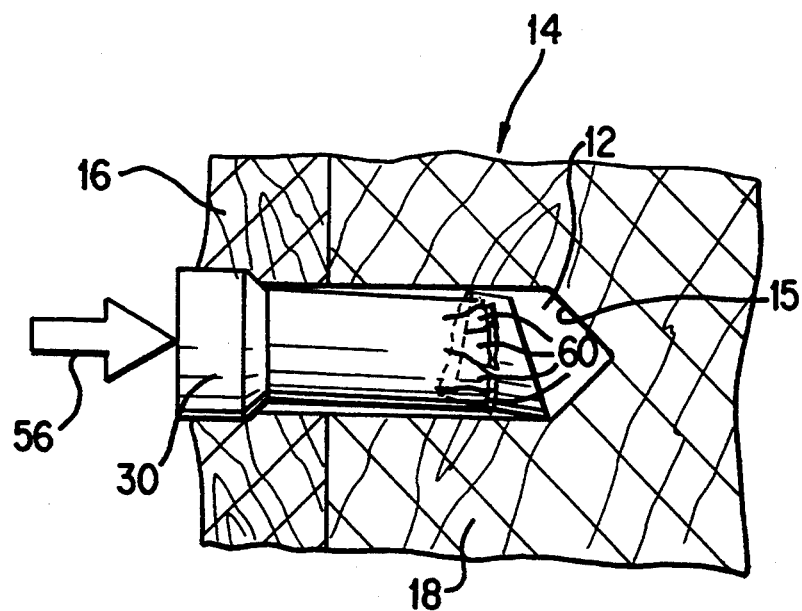
FIG. 6 is a view, similar to FIG. 5, after an impact force has been applied.

As illustrated in the drawing figures, the present invention is embodied as a tree treatment capsule, generally designated by reference number 10, adapted for insertion into a pre-drilled or otherwise formed bore 12 in the trunk of a tree 14. FIGS. 5 and 6 show how the illustrated embodiment of the invention reacts as it is inserted into the bore of a tree; these figures will be more fully discussed later. From FIGS. 5 and 6, it may be seen that if the capsule 10 is used to treat a tree, the bore 12 is dimensioned to extend through the bark 16 and into the phloem layer 18 of the tree 14. Notwithstanding the fact that, as illustrated, the present invention is used as a tree treatment capsule, it should be understood that the capsule 10 is equally useful for treating elements such as telephone poles, window frames, or any other element made of wood or similarly porous material which can appropriately be treated with a chemical or chemicals contained in the capsule.

FIGS. 1–4 most clearly illustrate the particular details of the capsule 10. The capsule 10 preferably is formed from two parts, namely, a hollow body 20 and a threaded cap 22 which are assembled together to form the capsule. The cap 22 preferably includes a solid cylindrical body portion 24 having a helical thread 26 running about its circumferential exterior. The cap 22 is further provided with a slot or notch 28 in one of its ends 29 to aid in assembling the cap 22 to the hollow body as will be described.

The hollow body 20 is of one piece construction and has several sections. These sections include a head section 30, a tapered transitional section 32, a first shank section 34 and a second shank section 36 separated from the first shank section 34 by a groove 38. The first shank section 34 and the second shank section 36 together define a shank 33. The groove 38 is formed in the circumferentially outer surface 39 of the shank and extends around the shank. As illustrated, the groove 38 is disposed such that it extends in a circle completely around the circumferential exterior of the shank. However, the groove could also be configured to extend only partially around the circumferential exterior of the shank. The groove could alternatively be formed wholly or partially in the circumferential inner surface of the shank. A series of recesses could also be used in place of the continuous groove 38.

The first and second shank sections 34 and 36, as shown, have identical outer diameters. Different outer diameters could be used if desired. The head section 30 is joined to one end of the shank, i.e., an end of the first shank section 34, by the tapered transitional section 32. The taper of the transitional section 32 may be either curved or straight. The head section 30 has an outer diameter which is larger than those of the first and second shank sections 34 and 36. Moreover, the outer diameter of head section 30 is designed to be larger than the diameter of the bore 12 while the diameters of the first and second shank sections are designed to be smaller than the diameter of the bore 12.

The second shank section 36 is formed with an end face 40 which is inclined at a preselected angle relative to the central axis A of the capsule 10. More specifically, the end face 40 is inclined so that a line L perpendicular to the end face 40 is oriented at an acute angle $\alpha$ relative to the central axis A; as illustrated, this angle is roughly 30°. Because it is inclined, the end face 40 defines both a distal edge portion 41 and a proximal edge portion 43 and is caused to be elliptical as viewed along the line L.

The embodiment of the invention which is illustrated includes a stabilizing or reinforcing rib 42 extending longitudinally along the circumferential inner surface 44 of the shank 33, i.e., in a direction parallel to axis A. Preferably, the rib 42 is integrally formed with the remainder of the hollow body 20. The reinforcing rib 42 provides added stability to the shank 33, which is particularly important in the section of the shank 33 immediately adjacent the groove 38. More specifically, because, for reasons which will become apparent, the groove 38 is provided in order to weaken the section of the shank 33 immediately adjacent the groove, the reinforcing rib 42 helps to avoid inadvertent breakage of the shank 33 during handling of the capsule 10 and insertion of the capsule 10 into the bore 12 in the trunk of the tree 14.

Inner surface 44 of the shank 33 cooperates with an inner surface 46 of the end face 40, an inner surface 48 of the transitional section 32 and an end 50 of the cap 22 to define a chemical agent containing cavity or volume 52. The chemical agent may be of any known kind such as, for instance, a herbicide, a fungicide, an insecticide or a wood preservative, depending on the type of element in which the capsule 10 is to be used. Moreover, the chemical agent may be in the form of a tablet, a powder, a liquid, a jelly or a paste, depending on the type of element in combination with which the capsule is to be used.

In order to assemble the capsule, the chemical agent is introduced into the volume 52, and the cap 22 is then secured in head section 30. More specifically, after the chemical agent is introduced into the volume 52, the cap 22 is placed in the open end of the head section 30 so that the helical thread 26 is aligned with and can be received in a helical groove 54 formed in the radially inner surface of head section 30. A screwdriver or similar tool (not shown) is inserted into the slot or notch 28 and a torque is applied by the tool to the cap 22 so that cooperation between the thread 26 and groove 54 causes the cap 22 to progress into the head section 30 to close off the volume 52. Glue may be used to help seal off the volume 52 from the surrounding environment and retain the cap 22 within the head section 30.

It is preferable to make all parts of the capsule 10 of a biodegradable plastic material which is broken down by exposure to tree sap, such as polyvinylalcohol. The use of polyvinylalcohol as the capsule material is particularly advantageous when the capsule is used to apply an appropriate chemical agent to a tree, since the polyvinylalcohol is readily broken down by sap of the tree. The capsule 10 could also be made of a harder or more brittle plastic material, such as polystyrene, or a material such as wood or glass. If the capsule is formed of wood or glass, the reinforcing rib 42 may be omitted, since it could be difficult to form the reinforcing rib properly.

Once the capsule 10 is assembled, it is thereafter inserted into the bore 12 until the distal edge 41 of the inclined end face 40 abuts an end wall 15 of the bore 12; since it is located at the greatest distance from the head section 30, the distal edge 41 abuts the wall 15 as is shown in FIG. 5. Thereafter, an impact force is applied, for instance, by hammering, as shown by arrow 56, to the head section 30 causing it, and the shank 33, to move into the bore 12. Because the presence of the groove 38 reduces the thickness of the wall of the shank 33 and weakens the shank, the shank will break along the groove 38 as the impact force is applied to the capsule 10. FIG. 6 shows the capsule 10 after the shank has been broken and the first and second shank sections 34 and 36 have separated from each other. Once the shank has been broken along the groove 38, the chemical agent is free to either leak out from the volume 52 or, if the chemical agent is in the form of a tablet or power, to mix with, for example, tree sap.

Because the distal edge 41 abuts the end wall 15 of the bore 12, it acts as a wedge and helps to translate the impact force applied to the head section 30 of the capsule into a stress which is applied to the groove 38, thus facilitating breakage of the shank 33.

Since the diameter of the head section 30 is larger than the diameter of bore 12, a very tight fit will be obtained between the head section 30 and the opening 13 of bore 12. This will hold the capsule very firmly in the bore 12 and prevent the chemical agent, when it is released, from leaking out of the bore 12 to the exterior of the tree. Tongues 60, which are formed when the shank 33 is broken along the groove 38, also exert pressure against the side walls of the bore 12, thus contributing to firm retention of the capsule in the bore. Clearly, tongues 60 will be formed only if a non-brittle material, such as polyvinylalcohol, is used as the capsule material; otherwise, the capsule will simply shatter.

Figure 7:
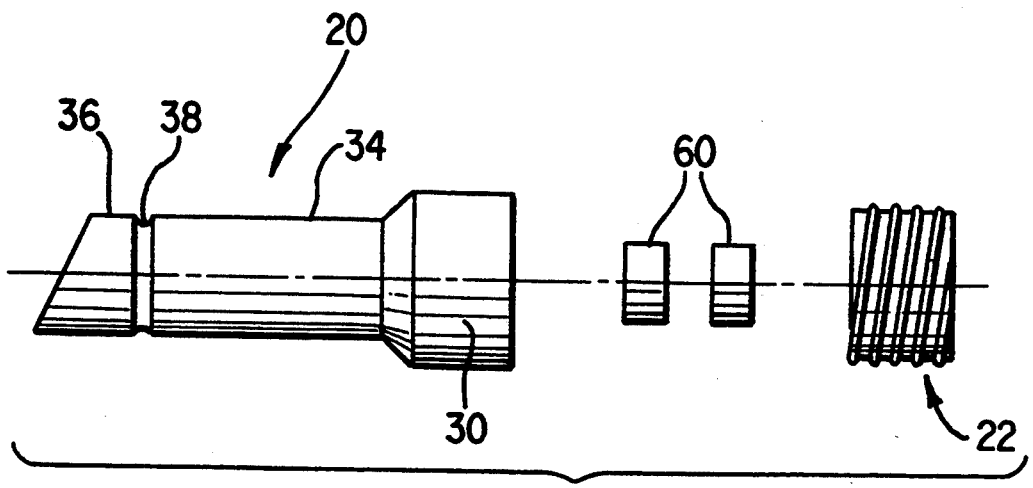
FIG. 7 is an exploded side view of a modified capsule according to the invention.
Figure 8:
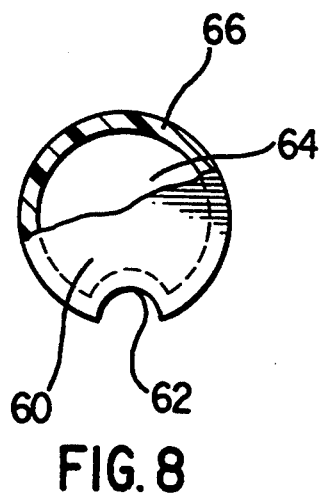
FIG. 8 is a partly sectional view of a plug usable in the modified capsule of FIG. 7.

FIGS. 7 and 8 show a modification of the inventive embodiment described above in which several intermediate hollow plugs 60 are provided. Each of the plugs 60 has a notch 62 defined therein so as to extend inwardly from its circumferential exterior. Each notch 62 has a profile which matches the profile defined by the surface of the stabilizing or reinforcing rib 42. As a result, each of the plugs 60 can be slid into the primary capsule cavity or volume 52, after the cavity or volume 52 has been partially filled with a chemical agent, by aligning its notch 62 with the rib 42. The cap 22 is then screwed into the open end of the head section 30.

Each of the plugs 60 is formed with an enclosed internal volume 64 defined by an exterior wall 66 and forming a secondary capsule volume. The plugs 60 are all made of a material which is easily broken down by, for example, tree sap, such as the polyvinylalcohol material mentioned above. Thus, the chemical with which the cavity or volume 52 has been partially filled is released immediately after an impact force is applied to the head section 30. Because the plugs 60 are not broken by the impact force, the chemical agent received in the internal volume 64 of each of the plugs 60 will be released at a later time, i.e.., after the exterior wall 66 has been broken down by, for example, tree sap. As a result, it is possible to release different types of chemical agents over various times. Consequently, if the capsule 10 is used to treat a tree, the cavity or volume 52 may, for example, be filled with a short term insecticide, the volume 64 of one plug 60 may be filled with a fungicide or another insecticide, and the volume 64 of another plug 60 may be filled with yet another type of fungicide or insecticide. Moreover, it is possible to cause the chemical agents contained within the volumes 64 of different plugs 60 to be released at different times simply by providing the exterior wall 66 of plugs 60 with a thickness which is different from that of the exterior wall 66 of another of the plugs 60.

Various modifications to the particular constructions described above will be apparent to those skilled in the art. Such modifications are intended to be covered by the appended claims.

I claim:

1. A capsule for insertion into a bore comprising:
a hollow head section having a first diameter;
a hollow shank extending along a central axis of said capsule and having a second diameter smaller than said first diameter and interconnected with said head section by a hollow tapered transitional section, said shank including an end face closing off an end thereof opposite to said transitional section and weakening means on said shank spaced from said end face, said end face being inclined relative to said central axis of said capsule so as to define a distal edge portion and a proximal edge portion thereof; and
a cap received within said head section and defining, together with inner surfaces of said shank, said transitional section and said end face, a capsule volume for storing a chemical agent;
said capsule being insertable into said bore so that when the capsule is inserted into the bore, said distal edge portion abuts an end wall of said bore, said shank being frangible along said weakening means so that when a force is applied to said head section, causing the head section to at least partly move into the bore, said distal edge portion translates said force into a stress which breaks said shank to release said chemical agent from said capsule volume.

2. A capsule as defined by claim 1, wherein said weakening means comprise a groove extending around its circumferential exterior and dividing said shank into a first shank section, extending between said transitional section and said groove, and a second shank section, extending between said end face and said groove.

3. A capsule as defined by claim 2, and further comprising a stabilizing rib extending over the first and second shank sections.

4. A capsule as defined by claim 3, wherein said stabilizing rib extends longitudinally throughout a section of said shank in which said groove is provided and along a circumferential inner surface of said shank.

5. A capsule as defined by claim 1, wherein said end face is inclined so that a line perpendicular to said end face is oriented at an acute angle relative to said central axis of said capsule.

6. A capsule as defined by claim 1, wherein said cap includes a cylindrical body portion having a helical thread running about its circumferential exterior, said helical thread being received in a helical groove formed in an inner surface of said head section.

7. A capsule as defined by claim 1, wherein said capsule volume is a primary capsule volume, and further comprising means, disposed within said primary capsule volume, for defining a secondary capsule volume.

8. A capsule as defined by claim 7, wherein the means for defining a secondary capsule volume is a hollow plug receivable in said primary capsule volume.

9. A capsule as defined by claim 7, wherein said chemical agent is a first chemical agent, and wherein a second chemical agent is contained in said secondary capsule volume.

10. A capsule as defined by claim 1, wherein all parts of said capsule are made of polyvinylalcohol.

11. A capsule as defined by claim 2, wherein said capsule volume is a primary capsule volume, and further comprising means, disposed within said primary capsule volume, for defining a secondary capsule volume.

12. A capsule as defined by claim 11, wherein the means for defining a secondary capsule volume is a hollow plug receivable in said primary capsule volume.

13. A capsule as defined by claim 12, wherein said chemical agent is a first chemical agent, and wherein a second chemical agent is contained in said secondary capsule volume.

14. A capsule as defined by claim 3, wherein said capsule volume is a primary capsule volume, and further comprising means, disposed within said primary capsule volume, for defining a secondary capsule volume.

15. A capsule as defined by claim 14, wherein the means for defining a secondary capsule volume is a hollow plug receivable in said primary capsule volume.

16. A capsule as defined by claim 15, wherein said chemical agent is a first chemical agent, and wherein a second chemical agent is contained in said secondary capsule volume.

17. A capsule as defined by claim 4, wherein said capsule volume is a primary capsule volume, and further comprising means, disposed within said primary capsule volume, for defining a secondary capsule volume.

18. A capsule as defined by claim 17, wherein the means for defining a secondary capsule volume is a hollow plug receivable in said primary capsule volume.

19. A capsule as defined by claim 18, wherein said chemical agent is a first chemical agent, and wherein a second chemical agent is contained in said secondary capsule volume.

* * * * *